(12) United States Patent
Wu

(10) Patent No.: US 11,805,457 B2
(45) Date of Patent: *Oct. 31, 2023

(54) METHOD OF ADDING SECONDARY CELL GROUP, TERMINAL DEVICE, AND MASTER NODE

(71) Applicant: VIVO MOBILE COMMUNICATION CO., LTD., Guangdong (CN)

(72) Inventor: Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/073,038

(22) Filed: Dec. 1, 2022

(65) Prior Publication Data

US 2023/0100752 A1 Mar. 30, 2023

Related U.S. Application Data

(63) Continuation of application No. 16/975,093, filed as application No. PCT/CN2019/074571 on Feb. 2, 2019, now Pat. No. 11,546,817.

(30) Foreign Application Priority Data

Feb. 24, 2018 (CN) .......................... 201810157672.1

(51) Int. Cl.
 *H04W 36/00* (2009.01)
 *H04W 24/10* (2009.01)
 *H04W 74/08* (2009.01)
 *H04W 84/18* (2009.01)

(52) U.S. Cl.
 CPC ..... *H04W 36/00837* (2018.08); *H04W 24/10* (2013.01); *H04W 74/0833* (2013.01); *H04W 84/18* (2013.01)

(58) Field of Classification Search
 None
 See application file for complete search history.

(56) References Cited

U.S. PATENT DOCUMENTS

| | | |
|---|---|---|
| 2016/0219604 A1 | 7/2016 | Fujishiro et al. |
| 2017/0055187 A1 | 2/2017 | Kang et al. |
| 2020/0029237 A1 | 1/2020 | Kim et al. |

FOREIGN PATENT DOCUMENTS

| | | |
|---|---|---|
| CN | 104936163 A | 9/2015 |
| CN | 107040864 A | 8/2017 |
| CN | 107295587 A | 10/2017 |

(Continued)

OTHER PUBLICATIONS

Office Action issued in corresponding U.S. Appl. No. 16/975,093, dated Jan. 19, 2022.

(Continued)

*Primary Examiner* — Suhail Khan
(74) *Attorney, Agent, or Firm* — Maschoff Brennan

(57) ABSTRACT

A method of adding a secondary cell group, a terminal device, and a main node are provided. The method of adding a secondary cell group includes: receiving conditional-addition SCG information sent by a master node; evaluating, according to the conditional-addition SCG information, whether one or more target cells in an SCG meet a condition corresponding to triggering addition of a target cell, and obtaining a result of the evaluation; triggering, according to the result of the evaluation, a process of adding a SCG target cell.

18 Claims, 4 Drawing Sheets

(56) References Cited

FOREIGN PATENT DOCUMENTS

| | | |
|---|---|---|
| EP | 2944110 A1 | 11/2015 |
| JP | WO2011040041 A1 | 2/2013 |
| WO | 2014/109606 A1 | 7/2014 |

OTHER PUBLICATIONS

Abdelrahim Mohamed, Mobility Prediction for Handover Management in Cellular Networks with Control/Data Separation, 2015 IEEE International Conference on Communications, Jun. 8, 2015, pp. 3939-3944.
NTT Docomo, Inc., Introduction of Dual Connectivity, R2-143417, 3GPP TSG-RAN WG2 #87, Dresden, Germany, Aug. 18-22, 2014.
European Search Report issued in corresponding application No. 19 75 6471, dated Mar. 2, 2021.
International Search Report and Written Opinion issued in corresponding application No. PCT/CN2019/074571, dated Sep. 3, 2020.

METHOD OF ADDING SECONDARY CELL GROUP, TERMINAL DEVICE, AND MASTER NODE

CROSS-REFERENCE TO RELATED APPLICATION

This application is a continuation of U.S. patent application Ser. No. 16/975,093, which is a U.S. national phase application of PCT Application No. PCT/CN2019/074571 filed on Feb. 2, 2019, which claims a priority to Chinese Patent Application No. 201810157672.1 filed in China on Feb. 24, 2018, the disclosures of which are incorporated in their entirety by reference herein.

TECHNICAL FIELD

The present disclosure relates to the field of communications technology, in particular relates to a method of adding a secondary cell group, a terminal device, and a master node.

BACKGROUND

In a fifth-generation (5 Generation, 5G) mobile communications system, terminal device such as a user equipment (User Equipment, UE) can adopt a dual connectivity (Dual Connectivity, DC) architecture including two cell groups which are respectively a master cell group (Master Cell Group, MCG) and a secondary cell group (Secondary Cell Group, SCG), the MCG corresponds to a master node (Master Node, MN) at a network side, and the SCG corresponds to a secondary node (secondary node, SN) at the network side. Specifically, the MCG includes a primary cell (Primary Cell, PCell) and a secondary cell (Secondary Cell, SCell), the SCG includes a primary secondary cell (Primary Secondary Cell, PSCell) and a SCell, and the PCell and PSCell can be collectively referred to as a special Cell (Special Cell, SpCell).

Currently, a main process of a conditional handover of the UE is as follows. An original node sends handover request information to one or more target nodes; the target nodes feed back handover confirmation information to the original node; the original node sends configuration information of the condition handover to the UE; the UE evaluates whether a candidate cell meets a handover condition, and if the handover condition is met, the UE selects a target cell for handover; the UE initiates a random access procedure in the selected target cell; the UE sends handover completion information to the target node; the original node sends a conditional-handover cancellation command to other target nodes; the other target nodes send the conditional-handover cancellation confirmation command to the original node.

Under the DC architecture, communications systems often need to be deployed with a large number of small cells and small base stations. In this condition, if a condition-based SCG addition process in related art is adopted, a large number of configuration signaling operations are required, which will cause a signaling loss, and it may be impossible to add SCG cells immediately and effectively, and it is impossible to quickly achieve load-balancing between a primary cell group and a secondary cell group, and utilization efficiency of air-interface resources is reduced.

SUMMARY

The embodiments of the present disclosure provide a method of adding a secondary cell group, a terminal device, and a master node, so as to solve a problem that a large number of configuration signaling operations are required by the method of the condition-based SCG addition method in the related art, a signaling loss is caused, and it is impossible to add SCG cells immediately and effectively.

In a first aspect, the embodiments of the present disclosure provide a method of adding a secondary cell group, the method is applied to a terminal device, the method includes: receiving conditional-addition SCG information sent by a master node; evaluating, according to the conditional-addition SCG information, whether one or more target cells in an SCG meet a condition corresponding to triggering addition of a target cell, and obtaining a result of the evaluation; triggering, according to the result of the evaluation, a process of adding a SCG target cell.

In the second aspect, the embodiments of the present disclosure also provide a method of adding a secondary cell group, the method is applied to a master node, the method includes sending conditional-addition SCG information to a terminal device; wherein the conditional-addition SCG information is used by the terminal device for evaluating, according to the conditional-addition SCG information, whether one or more target cells in an SCG meet a condition corresponding to triggering addition of a target cell, and obtaining a result of the evaluation, and triggering, according to the result of the evaluation, a process of adding a SCG target cell.

In a third aspect, the embodiments of the present disclosure also provide a terminal device. The terminal device includes: a first receiving module, used for receiving conditional-addition SCG information sent by a master node; an evaluating module, used for evaluating, according to the conditional-addition SCG information, whether one or more target cells in an SCG meet a condition corresponding to triggering addition of a target cell, and obtaining a result of the evaluation; a triggering module, used for triggering, according to the result of the evaluation, a process of adding a SCG target cell.

In a fourth aspect, the embodiments of the present disclosure also provide a master node. The master node includes a third sending module, used for sending conditional-addition SCG information to a terminal device, wherein the conditional-addition SCG information is used by the terminal device for evaluating, according to the conditional-addition SCG information, whether one or more target cells in an SCG meet a condition corresponding to triggering addition of a target cell, and obtaining a result of the evaluation, and triggering, according to the result of the evaluation, a process of adding a SCG target cell.

In a fifth aspect, the embodiments of the present disclosure also provide a terminal device. The terminal device includes a storage, a processor, and a computer program stored on the storage and executable by the processor, wherein, when the computer program is executed by the processor, the processor implements steps of the method of adding a secondary cell group applied to the terminal device.

In a sixth aspect, the embodiments of the present disclosure also provide a master node. The master node includes a storage, a processor, and a computer program stored on the storage and executable by the processor, wherein, when the computer program is executed by the processor, the processor implements steps of the method of adding a secondary cell group applied to the master node.

In a seventh aspect, the embodiments of the present disclosure also provide a computer readable storage medium having a computer program stored thereon, wherein when the computer program is executed by a processor, the processor implements steps of the method of adding a secondary cell group applied to the terminal device or the master node.

In the embodiments of the present disclosure, the conditional-addition SCG information sent by the master node is received, and whether one or more target cells in the SCG meet a condition corresponding to triggering addition of a target cell is evaluated according to the conditional-addition SCG information, and a result of the evaluation is obtained; and a process of adding a SCG target cell is triggered according to the result of the evaluation. This enables the terminal device to add a target cell in the SCG immediately and effectively when a network configuration condition is met, thereby reducing a loss of air-interface signaling and achieving fast load-balancing between primary and secondary cell groups, and improving utilization efficiency of air-interface resources.

BRIEF DESCRIPTION OF THE DRAWINGS

In order to explain technical solutions of the embodiments of the present disclosure more clearly, drawings to be used in the embodiments of the present disclosure will be briefly introduced below. Obviously, the drawings in the following description are only some embodiments of the present disclosure. Other drawings can be obtained by those of ordinary skill in the art from these drawings without paying creative work.

DETAILED DESCRIPTION

Hereinafter, exemplary embodiments of the present disclosure will be described in more detail with reference to accompanying drawings. Although the drawings show exemplary embodiments of the present disclosure, it should be understood that the present disclosure can be implemented in various forms and should not be limited by the embodiments set forth herein. On the contrary, these embodiments are provided to enable a more thorough understanding of the present disclosure and to fully convey the protection scope of the present disclosure to those skilled in the art.

Figure 1:
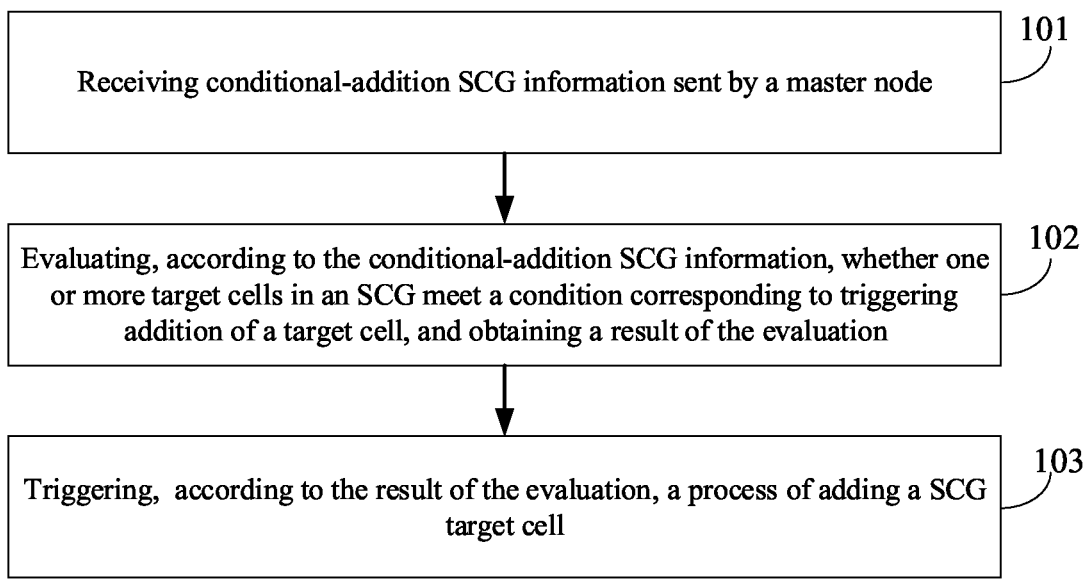
FIG. 1 is a flowchart of a method of adding a secondary cell group according to an embodiment of the present disclosure.

As shown in FIG. 1, an embodiment of the present disclosure provides a method of adding a secondary cell group. The method is applied to a terminal device, and includes the following steps 101-103.

Step 101: receiving conditional-addition SCG information sent by a master node.

Step 102: evaluating, according to the conditional-addition SCG information, whether one or more target cells in an SCG meet a condition corresponding to triggering addition of a target cell, and obtaining a result of the evaluation.

Step 103: triggering a process of adding a SCG target cell according to the result of the evaluation.

In the method of adding a secondary cell group in the embodiment of the present disclosure, the conditional-addition SCG information sent by the master node is received, and whether one or more target cells in the SCG meet a condition corresponding to triggering addition of a target cell is evaluated according to the conditional-addition SCG information, and a result of the evaluation is obtained; and a process of adding a target cell in the SCG is triggered according to the result of the evaluation. This enables the terminal device to add a target cell in the SCG immediately and effectively when a network configuration condition is met, thereby reducing a loss of air-interface signaling and achieving fast load-balancing between primary and secondary cell groups, and improving utilization efficiency of air-interface resources.

In the embodiment of the present disclosure, the conditional-addition SCG information may include one or more of the following: identification information of one or more target cells conditionally added; configuration information of one or more target cells conditionally added; one or more conditions corresponding to triggering the addition of a target cell; identification information of one or more conditions corresponding to triggering the addition of a target cell; effective time of one or more conditions corresponding to triggering the addition of a target cell.

It should be pointed out that identification information of a condition corresponding to triggering deletion of a target cell is specifically identification information of a corresponding condition corresponding to triggering deletion of the target cell.

Further, the condition corresponding to triggering the addition of the target cell includes one or more of the following: a measurement result of the target cell reaching or exceeding a preset threshold; a measurement result of a serving cell (such as an MCG cell) reaching or falling below a preset threshold; difference between the measurement result of the target cell and the measurement result of the serving cell (such as the MCG cell) reaching or exceeding a preset threshold; the measurement result of the target cell reaching or exceeding a first preset threshold, and the measurement result of the serving cell (such as the MCG cell) reaching or falling below a second preset threshold.

It should be understood that the foregoing preset threshold, the first preset threshold, and the second preset threshold are preset according to actual conditions, which are not limited in the embodiments of the present disclosure.

Further, the aforementioned measurement results may include one or more of the following: a reference symbol received power (Reference Symbol Received Power, RSRP), a reference signal received quality (Reference Signal Received Quality, RSRQ) and a signal interference noise ratio (Signal Interference Noise Ration, SINR).

In the embodiment of the present disclosure, when the terminal device triggers the process of adding a target cell in the SCG, the terminal device may perform at least one of the following steps: when the conditional-addition SCG information includes the configuration information of one or more target cells conditionally added, performing configuration according to configuration information of a SCG target cell that meets the condition corresponding to triggering the addition of the target cell; performing downlink synchronization with the SCG target cell that meets the condition corresponding to triggering the addition of the target cell; initiating a random access procedure in the SCG target cell that meets the condition corresponding to triggering the addition of the target cell.

Further, after triggering the process of adding the SCG target cell, the terminal device may also perform at least one of the following steps: stopping evaluating whether one or more target cells in the SCG meet the condition corresponding to triggering the addition of target cells; deleting one or more conditions corresponding to triggering the addition of the target cell; deleting unconfigured (that is, unapplied, unadded) configuration information of one or more target cells conditionally added.

In the embodiment of the present disclosure, if a network side configures the effective time of the condition corresponding to triggering the addition of the target cell, that is, the conditional-addition SCG information sent by the network node includes one or more conditions corresponding to triggering the addition of the target cell and the effective time of the one or more conditions. The above step 102 may include: for each condition corresponding to triggering the addition of the target cell, starting a timer, wherein a duration of the timer is the effective time corresponding to each condition corresponding to triggering the addition of the target cell; before the timer expires, evaluating whether a corresponding target cell meets the condition corresponding to triggering the addition of the target cell, and obtaining the result of the evaluation; that is, after the timer expires, the terminal device no longer evaluates and judges the corresponding target cell.

Further, in a case of starting at least one timer, the terminal device may also perform at least one of the following steps: when the conditional-addition SCG information includes identification information of one or more conditions corresponding to triggering the addition of the target cell, and one or more timers (including all timers) of the at least one timer expires, deleting identification information, corresponding to an expired timer, of a condition corresponding to triggering addition of the target cell; when the conditional-addition SCG information includes configuration information of one or more target cells conditionally added, and one or more timers (including all timers) of the at least one timer expires, deleting configuration information, corresponding to an expired timer, of the target cell conditionally added.

In the embodiment of the present disclosure, after receiving the conditional-addition SCG information sent by the master node, the terminal device may also send configuration confirmation information to the master node. The configuration confirmation information is used by the master node to determine corresponding conditional-addition SCG confirmation information. Contents included in the confirmation information of the corresponding conditional-addition SCG information may be the same as content included in the configuration confirmation information.

Optionally, the configuration confirmation information includes one or more of the following: information of rejecting a SCG conditionally added; information of agreeing a SCG conditionally added.

Optionally, the information of rejecting the SCG conditionally added includes one or more of the following: identification information of one or more rejected target cells conditionally added; one or more rejected conditions corresponding to triggering the addition of the target cell; identification information of one or more rejected conditions corresponding to triggering the addition of the target cell.

Optionally, the information of agreeing the SCG conditionally added includes one or more of the following: identification information of one or more agreed target cells conditionally added; configuration information of one or more agreed target cells conditionally added; one or more agreed conditions corresponding to triggering the addition of the target cell; identification information of one or more agreed conditions corresponding to triggering the addition of the target cell.

In the embodiment of the present disclosure, after obtaining the result of the evaluation, the terminal device may also send a notification message to the master node. The notification message is used to notify the master node of related information of the SCG added by the terminal device.

Optionally, the related information of the SCG added by the terminal device includes one or more of the following: identification information of one or more target cells conditionally added; identification information of one or more met conditions corresponding to triggering the addition of the target cell; configuration information of one or more target cells added under a met condition.

Figure 2:
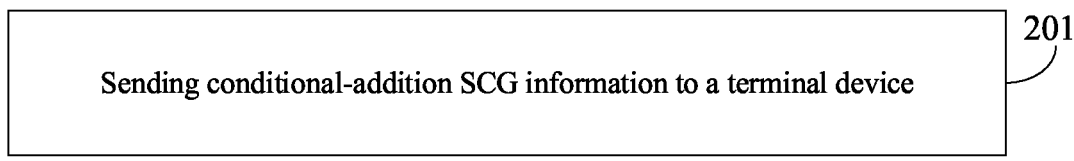
FIG. 2 is another flowchart of a method of adding a secondary cell group according to an embodiment of the present disclosure.

As shown in FIG. 2, an embodiment of the present disclosure also provides a method of adding a secondary cell group. The method is applied to a master node, and includes the following step 201.

Step 201: sending conditional-addition SCG information to a terminal device; wherein the conditional-addition SCG information is used by the terminal device for evaluating, according to the conditional-addition SCG information, whether one or more target cells in an SCG meet a condition corresponding to triggering addition of a target cell, and obtaining a result of the evaluation, and triggering a process of adding a SCG target cell according to the result of the evaluation.

In the method of adding a secondary cell group in the embodiment of the present disclosure, the conditional-addition SCG information is sent to a terminal device. The terminal device is enabled to evaluate, according to the conditional-addition SCG information, whether one or more target cells in the SCG meet a condition corresponding to triggering addition of a target cell, and obtain a result of the evaluation; and trigger a process of adding a SCG target cell according to the result of the evaluation. This enables an operation of adding a target cell in the SCG immediately and effectively when a network configuration condition is met, thereby reducing a loss of air-interface signaling and achieving fast load-balancing between primary and secondary cell groups, and improving utilization efficiency of air-interface resources.

In the embodiment of the present disclosure, before step 201, the method further includes: sending conditional-addition SCG request information to one or more secondary nodes; receiving conditional-addition SCG feedback information sent by the one or more secondary nodes; wherein the conditional-addition SCG feedback information is used by the master node to determine corresponding conditional-addition SCG information.

Optionally, the conditional-addition SCG request information includes one or more of the following: identification information of one or more target cells conditionally added; one or more conditions corresponding to triggering the addition of a target cell; identification information of one or more conditions corresponding to triggering the addition of a target cell; effective time of one or more conditions corresponding to triggering the addition of a target cell.

Optionally, the condition corresponding to triggering the addition of the target cell includes one or more of the following: a measurement result of the target cell reaching or exceeding a preset threshold; a measurement result of a serving cell (such as an MCG cell) reaching or falling below a preset threshold; difference between the measurement result of the target cell and the measurement result of the serving cell reaching or exceeding a preset threshold; the measurement result of the target cell reaching or exceeding a first preset threshold, and the measurement result of the serving cell reaching or falling below a second preset threshold.

Optionally, the measurement result includes one or more of the following: the RSRP, the RSRQ and the SINR.

Optionally, the conditional-addition SCG feedback information includes one or more of the following: information of rejecting a SCG conditionally added; information of agreeing a SCG conditionally added.

Optionally, the information of rejecting the SCG conditionally added includes one or more of the following: identification information of one or more rejected target cells conditionally added; one or more rejected conditions corresponding to triggering the addition of the target cell; identification information of one or more rejected conditions corresponding to triggering the addition of the target cell.

Optionally, the information of agreeing the SCG conditionally added includes one or more of the following: identification information of one or more agreed target cells conditionally added; configuration information of one or more agreed target cells conditionally added; one or more agreed conditions corresponding to triggering the addition of the target cell; effective time of one or more agreed conditions corresponding to triggering the addition of the target cell.

In the embodiment of the present disclosure, after step 201, the method further includes: receiving configuration confirmation information sent by the terminal device; sending conditional-addition SCG confirmation information to the one or more secondary nodes.

In the embodiment of the present disclosure, after receiving the conditional-addition SCG feedback information sent by one or more secondary nodes, the method further includes: receiving conditional-addition SCG indication information sent by a target secondary node; wherein the conditional-addition SCG indication information is sent by the target secondary node after the target secondary node detects that the terminal device accesses the target cell.

Optionally, the conditional-addition SCG indication information includes one or more of the following: identification information of the terminal device; identification information of one or more target cells conditionally added; identification information of one or more conditions corresponding to triggering the addition of the target cell; configuration information of one or more target cells added under a met condition; identification information of the target secondary node.

In the embodiment of the present disclosure, after receiving the conditional-addition SCG feedback information sent by one or more secondary nodes, the method further includes: sending, to other secondary nodes, related information of cancelling a conditional-addition SCG; wherein the related information of cancelling a conditional-addition SCG is used for the other secondary nodes to cancel a resource reserved for the corresponding conditional-addition SCG, the other secondary nodes are secondary nodes other than the target secondary node among the one or more secondary nodes.

Further, after sending, to the other secondary nodes, the related information of canceling the conditional-addition SCG, the method further includes: receiving confirmation information sent by the other secondary nodes; wherein the confirmation information is used by the master node to confirm that the corresponding conditional-addition SCG has been cancelled.

In an embodiment of the present disclosure, after receiving the conditional-addition SCG feedback information sent by one or more secondary nodes, the method further includes: receiving related information, sent by other secondary nodes, of cancelling a conditional-addition SCG; confirming, according to the related information of cancelling the conditional-addition SCG, that the corresponding conditional-addition SCG is cancelled; wherein the other secondary nodes are secondary nodes other than the target secondary node among the one or more secondary nodes.

Optionally, the related information of cancelling the conditional-addition SCG includes one or more of the following: identification information of one or more cancelled target cells conditionally added; identification information of one or more cancelled conditions corresponding to triggering the addition of the target cell; configuration information of one or more cancelled target cells conditionally added; identification information of the terminal device.

In the embodiment of the present disclosure, after step 201, the method further includes: sending updated configuration information to the terminal device; wherein the updated configuration information is used for the terminal device to cancel the related information of the corresponding conditional-addition SCG.

Optionally, the updated configuration information includes one or more of the following: identification information of one or more cancelled target cells conditionally added; identification information of one or more cancelled conditions corresponding to triggering the addition of the target cell; configuration information of one or more cancelled target cells conditionally added.

Figure 3:
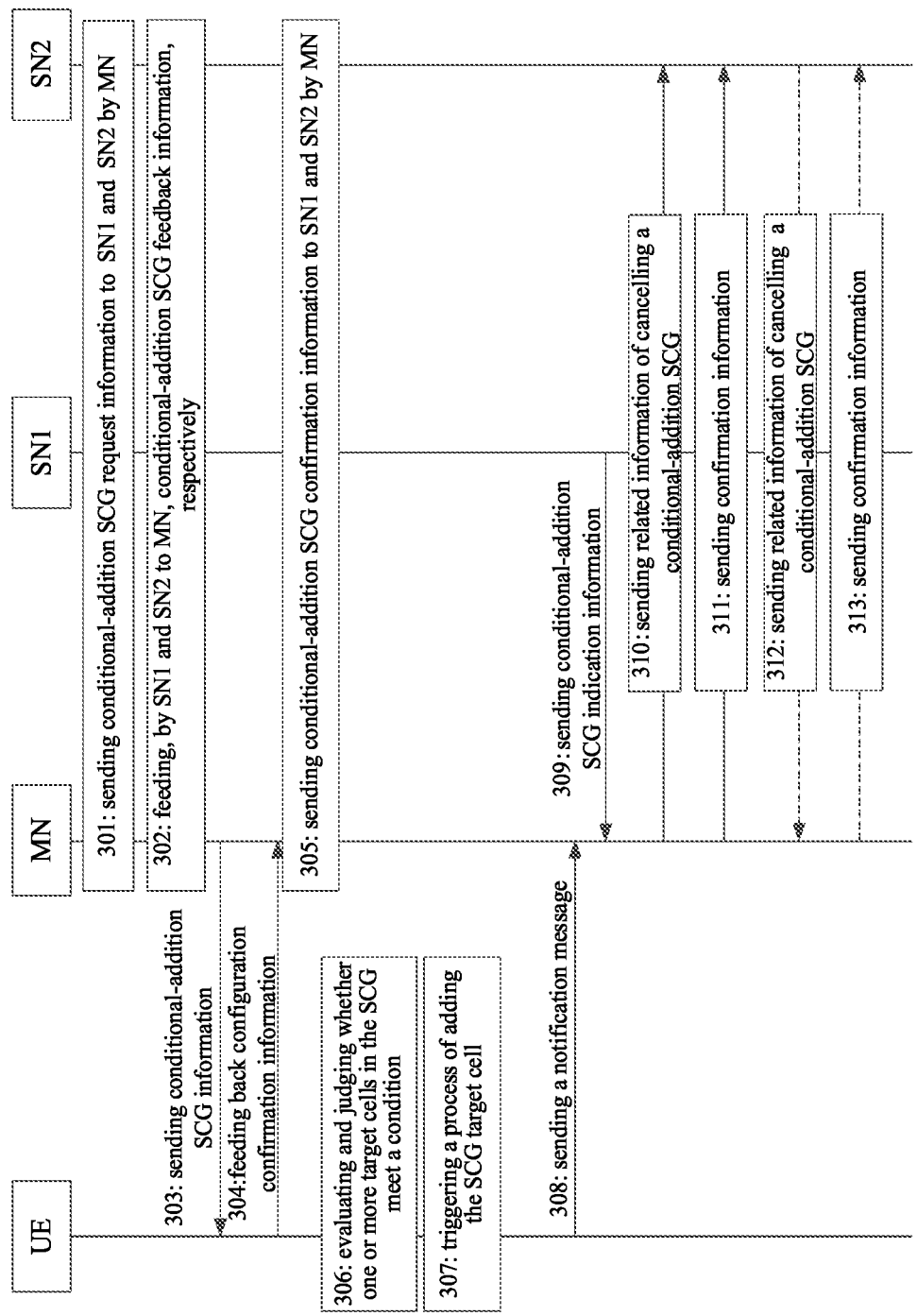
FIG. 3 is a flowchart of a process of adding a secondary cell group in a specific example of the present disclosure.

A condition-based process of adding a secondary cell group in a specific example of the present disclosure will be described with reference to FIG. 3 hereinafter.

In an embodiment of the present disclosure, two secondary nodes SN1 and SN2 are taken as an example (but the present disclosure is not limited thereto, there may be a plurality of secondary nodes in other examples, such as three or five secondary nodes), wherein SN1 is the target secondary node, SN2 is the other secondary node. Referring to FIG. 3, the processing of adding a secondary cell group may include the following steps 301-313.

Step 301: sending conditional-addition SCG request information to the SN1 and the SN2 by the MN, wherein contents included in conditional-addition SCG request information can be the contents contained in the above conditional-addition SCG request information.

Step 302: feeding, by the SN1 and the SN2 to the MN, conditional-addition SCG feedback information, respectively, wherein the content included in the conditional-addition SCG feedback information can be the content contained in the above-mentioned conditional-addition SCG feedback information.

Step 303: sending conditional-addition SCG information (this information may be sent by means of an RRC connection reconfiguration message, that is, air-interface configuration information) to a UE by the MN, wherein the content included in the conditional-addition SCG information can be the content contained in the above-mentioned conditional-addition SCG information.

Step 304: feeding back configuration confirmation information (this information can be fed back by means of the RRC connection reconfiguration completion message) to the MN by the UE, wherein the contents included in the configuration confirmation message can be the contents contained in the above configuration confirmation message.

Step 305: sending, according to the received configuration confirmation information, conditional-addition SCG confirmation information (this information can be transmitted by means of RRC connection reconfiguration complete message) to the SN1 and the SN2 by the MN; wherein the content included in the conditional-addition SCG confirmation information may be the same as the content contained in the configuration confirmation information.

Step 306: evaluating and judging, by the UE according to the received conditional-addition SCG information, whether one or more target cells in the SCG meet a condition corresponding to triggering addition of a target cell, and obtaining the result of the evaluation.

Step 307: triggering, by the UE according to the obtained result of the evaluation, a process of adding the SCG target cell.

The process may be one or more of the following: performing configuration according to configuration information of a SCG target cell meeting the condition corresponding to triggering the addition of the target cell; performing downlink synchronization with the SCG target cell that meets the condition corresponding to triggering the addition of the target cell; initiating a random access procedure in the SCG target cell that meets the condition corresponding to triggering the addition of the target cell.

Additionally, the UE may also perform at least one of the following actions: stopping evaluating whether one or more target cells in the SCG meet the condition corresponding to triggering the addition of target cells; deleting one or more conditions corresponding to triggering the addition of the target cell; deleting unconfigured configuration information of one or more target cells conditionally added Step 308: after obtaining the result of the evaluation, sending a notification message to the MN by the UE, wherein the notification message is used for notifying the MN of the related information of the conditionally added SCG met by the UE, and the content included in the related information of the added SCG can be the content contained in the related information of the above-mentioned added SCG.

Step 309: after the SN1 detects that the UE accesses the target cell, sending, by SN1 to the MN, conditional-addition SCG indication information, wherein the content included in the conditional-addition SCG indication information can be the content in the above conditional-addition SCG indication information.

Step 310: sending, by the MN to the SN2, related information of cancelling a conditional-addition SCG, wherein the content included in the related information of cancelling the conditional-addition SCG can be the content contained in the above related information of cancelling the conditional-addition SCG.

Step 311: cancelling, by the UE according to the received related information of cancelling the conditional-addition SCG, a resource reserved for a corresponding conditional-addition SCG, and sending confirmation information to the MN, wherein the confirmation information is used for the MN to confirm that the corresponding conditional-addition SCG has been canceled.

Here, step 310 and step 311 may be initiated at any time after step 302.

Step 312: sending, by the SN2 to the MN, the related information of cancelling the conditional-addition SCG, wherein the content included in the related information of cancelling the conditional-addition SCG can be the content contained in the above related information of cancelling the conditional-addition SCG.

Step 313: confirming, by the MN according to the received related information of cancelling the conditional-addition SCG, cancellation of the corresponding conditional-addition SCG, and sending confirmation information to the SN2.

Here, step 312 and step 313 may be initiated at any time after step 302.

Additionally, the MN may send updated configuration information to the UE (this process may employ a message type consistent with that in step 303), so that the UE cancels related information of the corresponding conditional-addition SCG, and the contents included in the updated configuration information can be the contents contained in the above-mentioned updated configuration information.

The above-described embodiments describe the method of adding a secondary cell group of the present disclosure, and the terminal device and the master node of the present disclosure will be described below with reference to the embodiments and the drawings.

Figure 4:
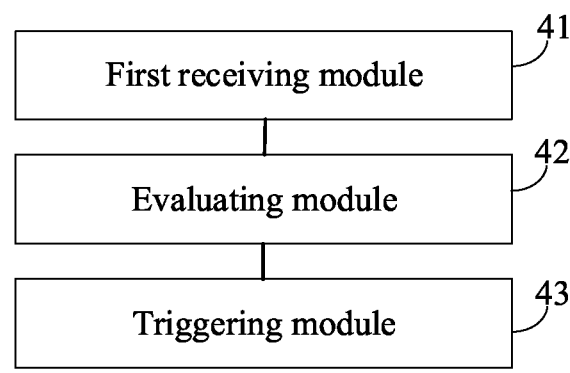
FIG. 4 is a first schematic structural diagram of a terminal device according to an embodiment of the present disclosure.

Referring to FIG. 4, an embodiment of the present disclosure further provides a terminal device. The terminal device includes: a first receiving module 41, an evaluating module 42, and a triggering module 43.

The first receiving module 41 is used for receiving conditional-addition SCG information sent by a master node. The evaluating module 42 is used for evaluating, according to the conditional-addition SCG information, whether one or more target cells in an SCG meet a condition corresponding to triggering addition of a target cell, and obtaining a result of the evaluation. The triggering module 43 is used for triggering a process of adding a SCG target cell according to the result of the evaluation.

The terminal device receives the conditional-addition SCG information sent by the master node, evaluates, according to the conditional-addition SCG information, whether one or more target cells in the SCG meet a condition corresponding to triggering addition of a target cell, and obtains a result of the evaluation, and triggers, according to the result of the evaluation, a process of adding a target cell in the SCG. This enables the terminal device to add a target cell in the SCG immediately and effectively when a network configuration condition is met, thereby reducing a loss of air-interface signaling and achieving fast load-balancing between primary and secondary cell groups, and improving utilization efficiency of air-interface resources.

Optionally, the conditional-addition SCG information may include one or more of the following: identification information of one or more target cells conditionally added; configuration information of one or more target cells conditionally added; one or more conditions corresponding to triggering the addition of a target cell; identification information of one or more conditions corresponding to triggering the addition of a target cell; effective time of one or more conditions corresponding to triggering the addition of a target cell.

Optionally, the condition corresponding to triggering the addition of the target cell includes one or more of the following: a measurement result of the target cell reaching or exceeding a preset threshold; a measurement result of a serving cell reaching or falling below a preset threshold; difference between the measurement result of the target cell and the measurement result of the serving cell reaching or exceeding a preset threshold; the measurement result of the target cell reaching or exceeding a first preset threshold, and the measurement result of the serving cell reaching or falling below a second preset threshold.

Optionally, the aforementioned measurement results include one or more of the following: a reference symbol received power (RSRP), a reference signal received quality (RSRQ) and a signal interference noise ratio (SINR).

Optionally, the trigger module 43 is specifically used to perform one or more of the following: when the conditional-addition SCG information includes the configuration information of one or more target cells conditionally added, performing configuration according to configuration information of a SCG target cell that meets the condition corresponding to triggering the addition of the target cell; performing downlink synchronization with the SCG target cell that meets the condition corresponding to triggering the addition of the target cell; initiating a random access procedure in the SCG target cell that meets the condition corresponding to triggering the addition of the target cell.

Optionally, the conditional-addition SCG information includes one or more conditions corresponding to triggering the addition of the target cell and the effective time of the one or more conditions, and the evaluating module 42 is specifically used for: for each condition corresponding to triggering the addition of the target cell, starting a timer, wherein a duration of the timer is the effective time of each condition corresponding to triggering the addition of the target cell; before the timer expires, evaluating whether a corresponding target cell meets the condition corresponding to triggering the addition of the target cell, and obtaining the result of the evaluation.

In the embodiment of the present disclosure, the terminal device may further include a deleting module. The deleting module is used for, in a case of starting at least one timer, when the conditional-addition SCG information includes identification information of one or more conditions corresponding to triggering the addition of the target cell, and one or more timers of the at least one timer expires, deleting identification information, corresponding to an expired timer, of a condition corresponding to triggering addition of the target cell; and/or, in a case of starting at least one timer, when the conditional-addition SCG information includes configuration information of one or more target cells conditionally added, and one or more timers of the at least one timer expires, deleting configuration information, corresponding to an expired timer, of the target cell conditionally added.

In the embodiment of the present disclosure, the terminal device further includes a first sending module, used for sending configuration confirmation information to the master node, wherein the configuration confirmation information is used by the master node to determine corresponding conditional-addition SCG confirmation information.

Optionally, the configuration confirmation information includes one or more of the following: information of rejecting a SCG conditionally added; information of agreeing a SCG conditionally added.

Optionally, the information of rejecting the SCG conditionally added includes one or more of the following: identification information of one or more rejected target cells conditionally added; one or more rejected conditions corresponding to triggering the addition of the target cell; identification information of one or more rejected conditions corresponding to triggering the addition of the target cell.

Optionally, the information of agreeing the SCG conditionally added includes one or more of the following: identification information of one or more agreed target cells conditionally added; configuration information of one or more agreed target cells conditionally added; one or more agreed conditions corresponding to triggering the addition of the target cell; identification information of one or more agreed conditions corresponding to triggering the addition of the target cell.

In an embodiment of the present disclosure, the terminal device further includes a second sending module used for sending a notification message to the master node, wherein the notification message is used to notify the master node of related information of the SCG added by the terminal device.

Optionally, the related information of the SCG added by the terminal device includes one or more of the following: identification information of one or more target cells conditionally added; identification information of one or more met conditions corresponding to triggering the addition of the target cell; configuration information of one or more target cells added under a met condition.

Figure 5:
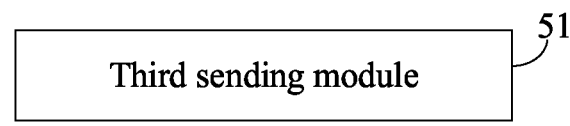
FIG. 5 is a first schematic structural diagram of a master node according to an embodiment of the present disclosure.

Optionally, the terminal device further includes a processing module used for performing at least one of following: stopping evaluating whether one or more target cells in the SCG meet the condition corresponding to triggering the addition of a target cell; deleting one or more conditions corresponding to triggering the addition of the target cell; deleting unconfigured configuration information of one or more target cells conditionally added As shown in FIG. 5, an embodiment of the present disclosure further provides a master node. The master node includes a third sending module 51 used for sending conditional-addition SCG information to a terminal device; wherein the conditional-addition SCG information is used by the terminal device for evaluating, according to the conditional-addition SCG information, whether one or more target cells in an SCG meet a condition corresponding to triggering addition of a target cell, and obtaining a result of the evaluation, and triggering, according to the result of the evaluation, a process of adding a target cell in the SCG.

The master node in the embodiment of the present disclosure sends the conditional-addition SCG information to a terminal device, so that the terminal device is enabled to evaluate, according to the conditional-addition SCG information, whether one or more target cells in the SCG meet a condition corresponding to triggering addition of a target cell, and obtain a result of the evaluation; and trigger, according to the result of the evaluation, a process of adding a target cell in the SCG. This enables an operation of adding a target cell in the SCG immediately and effectively when a network configuration condition is met, thereby reducing a loss of air-interface signaling and achieving fast load-balancing between primary and secondary cell groups, and improving utilization efficiency of air-interface resources.

Optionally, the primary node further includes a first transceiving module used for sending conditional-addition SCG request information to one or more secondary nodes; receiving conditional-addition SCG feedback information sent by the one or more secondary nodes; wherein the conditional-addition SCG feedback information is used by the master node to determine corresponding conditional-addition SCG information.

Optionally, the conditional-addition SCG request information includes one or more of the following: identification information of one or more target cells conditionally added; one or more conditions corresponding to triggering the addition of a target cell; identification information of one or more conditions corresponding to triggering the addition of a target cell; effective time of one or more conditions corresponding to triggering the addition of a target cell.

Optionally, the condition corresponding to triggering the addition of the target cell includes one or more of the following: a measurement result of the target cell reaching or exceeding a preset threshold; a measurement result of a serving cell reaching or falling below a preset threshold; difference between the measurement result of the target cell and the measurement result of the serving cell reaching or exceeding a preset threshold; the measurement result of the target cell reaching or exceeding a first preset threshold, and the measurement result of the serving cell reaching or falling below a second preset threshold.

Optionally, the measurement result includes one or more of the following: the RSRP, the RSRQ and the SINR.

Optionally, the conditional-addition SCG feedback information includes one or more of the following: information of rejecting a SCG conditionally added; information of agreeing a SCG conditionally added.

Optionally, the information of rejecting the SCG conditionally added includes one or more of the following: identification information of one or more rejected target cells conditionally added; one or more rejected conditions corresponding to triggering the addition of the target cell; identification information of one or more rejected conditions corresponding to triggering the addition of the target cell.

Optionally, the information of agreeing the SCG conditionally added includes one or more of the following: identification information of one or more agreed target cells conditionally added; configuration information of one or more agreed target cells conditionally added; one or more agreed conditions corresponding to triggering the addition of the target cell; effective time of one or more agreed conditions corresponding to triggering the addition of the target cell.

Optionally, the master node further includes a second transceiving module used for receiving configuration confirmation information sent by the terminal device; and sending conditional-addition SCG confirmation information to the one or more secondary nodes.

Optionally, the master node further includes a second receiving module used for receiving conditional-addition SCG indication information sent by a target secondary node; wherein the conditional-addition SCG indication information is sent by the target secondary node after the target secondary node detects that the terminal device accesses the target cell.

Optionally, the conditional-addition SCG indication information includes one or more of the following: identification information of the terminal device; identification information of one or more target cells conditionally added; identification information of one or more conditions corresponding to triggering the addition of the target cell; configuration information of one or more target cells added under a met condition; identification information of the target secondary node.

Optionally, the master node further includes a fourth sending module used for sending, to other secondary nodes, related information of cancelling a conditional-addition SCG; wherein the related information of cancelling a conditional-addition SCG is used for the other secondary nodes to cancel a resource reserved for the corresponding conditional-addition SCG, the other secondary nodes are secondary nodes other than the target secondary node among the one or more secondary nodes.

Further, the master node further includes a third receiving module used for receiving confirmation information sent by the other secondary nodes; wherein the confirmation information is used by the master node to confirm that the corresponding conditional-addition SCG has been cancelled.

Optionally, the master node further includes a fourth receiving module used for receiving related information, sent by other secondary nodes, of cancelling a conditional-addition SCG; a confirming module used for confirming, according to the related information of cancelling the conditional-addition SCG, that the corresponding conditional-addition SCG is cancelled; wherein the other secondary nodes are secondary nodes other than the target secondary node among the one or more secondary nodes.

Optionally, the related information of cancelling the conditional-addition SCG includes one or more of the following: identification information of one or more cancelled target cells conditionally added; identification information of one or more cancelled conditions corresponding to triggering the addition of the target cell; configuration information of one or more cancelled target cells conditionally added; identification information of the terminal device.

Optionally, the master node further includes a fifth sending module used for sending updated configuration information to the terminal device; wherein the updated configuration information is used for the terminal device to cancel the related information of the corresponding conditional-addition SCG.

Optionally, the updated configuration information includes one or more of the following: identification information of one or more cancelled target cells conditionally added; identification information of one or more cancelled conditions corresponding to triggering the addition of the target cell; configuration information of one or more cancelled target cells conditionally added.

An embodiment of the present disclosure also provides a terminal device including a processor, a storage, a computer program stored on the storage and executable by the processor, wherein, when the computer program is executed by the processor, the processor implements each process of various embodiments of the above method of adding a secondary cell group applied to the terminal device, and the same technical effect can be achieved, and is not repeated herein.

Figure 6:
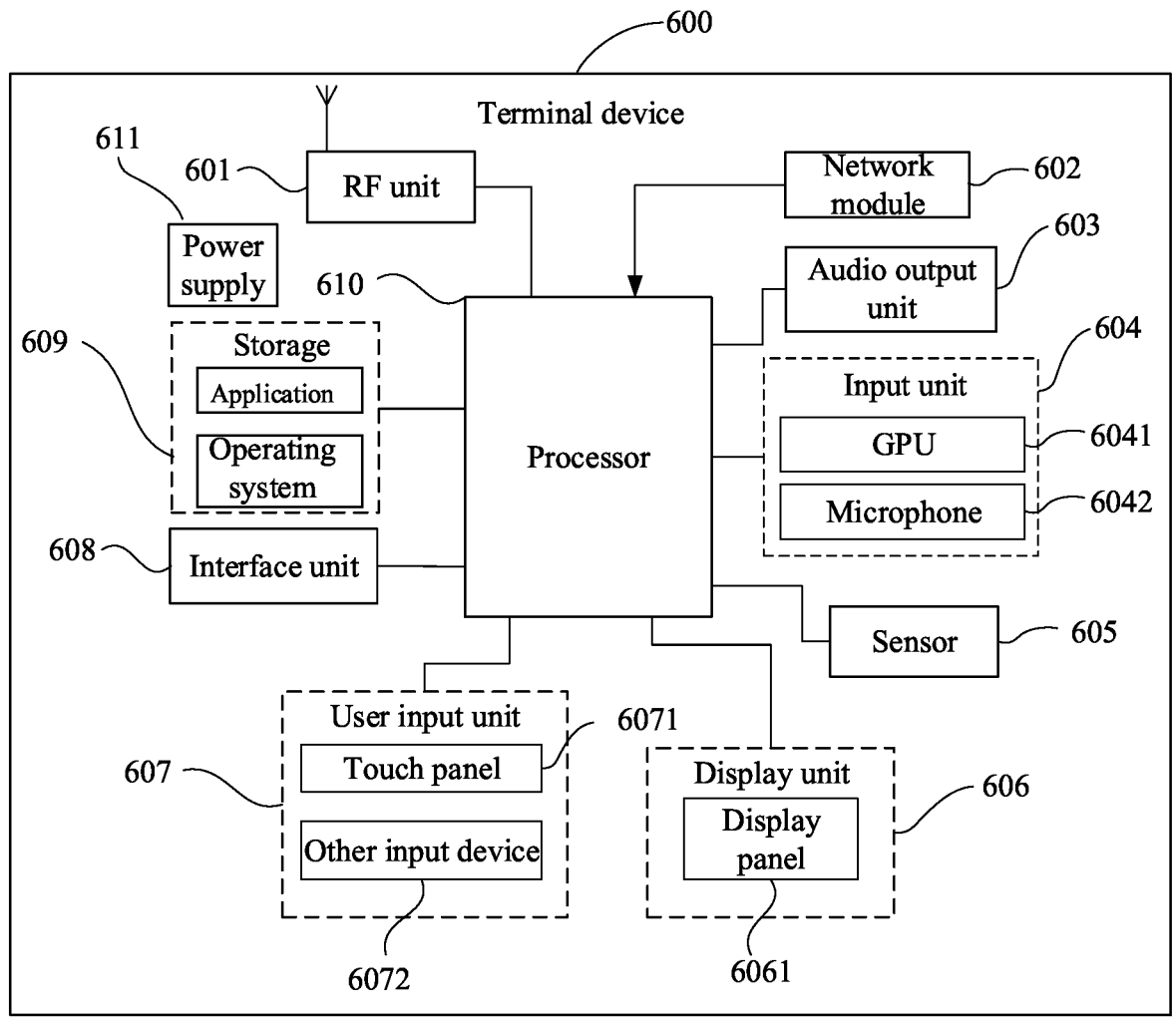
FIG. 6 is a second schematic structural diagram of a terminal device according to an embodiment of the present disclosure.

In particular, FIG. 6 is a schematic diagram of a hardware structure of a terminal device implementing various embodiments of that present disclosure, The terminal device 600 includes, but is not limited to, a radio frequency unit 601, a network module 602, an audio output unit 603, an input unit 6014, a sensor 605, a display unit 606, a user input unit 607, an interface unit 608, a storage 609, a processor 610, and a power supply 611, and other components. Those skilled in the art will appreciate that a structure of the terminal shown in FIG. 6 does not constitute a limitation of a terminal. The terminal device may include more or fewer components than illustrated, or combine certain components, or different component arrangements. In some embodiments of the present disclosure, the terminal includes, but is not limited to, a mobile phone, a tablet computer, a notebook computer, a palmtop computer, an in-vehicle terminal, a wearable device, a pedometer, and the like.

The radio frequency unit 601 is used for receiving conditional-addition SCG information sent by a master node. The processor 610 is used for evaluating, according to the conditional-addition SCG information, whether one or more target cells in an SCG meet a condition corresponding to triggering addition of a target cell, and obtaining a result of the evaluation; and triggering, according to the result of the evaluation, a process of adding a target cell in the SCG.

The terminal device 600 of the embodiment of the present disclosure receives the conditional-addition SCG information sent by the master node, evaluates, according to the conditional-addition SCG information, whether one or more target cells in the SCG meet a condition corresponding to triggering addition of a target cell, and obtains a result of the evaluation, and triggers, according to the result of the evaluation, a process of adding a target cell in the SCG. This enables the terminal device to add a target cell in the SCG immediately and effectively when a network configuration condition is met, thereby reducing a loss of air-interface signaling and achieving fast load-balancing between primary and secondary cell groups, and improving utilization efficiency of air-interface resources.

It should be understood that, in the embodiment of the present disclosure, the radio frequency unit 601 is used for receiving and transmitting signals in processes of transmitting and receiving information or talking. Specifically, after the radio frequency unit 601 receives downlink data from a base station, and the downlink data is transferred by the radio frequency unit 601 to the processor 610 for processing; and additionally the radio frequency unit 601 sends uplink data to the base station. Generally, the radio frequency unit 601 includes, but is not limited to, an antenna, at least one amplifier, a transceiver, a coupler, a low noise amplifier, a duplexer, and the like. In addition, the radio frequency unit 601 may also communicate with a network and other devices through a wireless communication system.

The terminal device provides a wireless broadband internet access to a user through the network module 602, such as helping the user to send and receive emails, browse web pages, access streaming media, and the like.

The audio output unit 603 may convert audio data received by the radio frequency unit 601 or the network module 602 or stored in the storage 609 into an audio signal and output the audio signal as sound. The audio output unit 603 may also provide audio output (e.g., a call signal reception sound, a message reception sound, etc.) related to a specific function performed by the terminal device 600. The audio output unit 603 includes a speaker, a buzzer, a receiver, and the like.

The input unit 604 is used to receive an audio or video signal. The input unit 604 may include a Graphics Processing Unit (GPU) 6041 and a microphone 6042. The graphics processing unit 6041 processes image data of a still picture or a video obtained by an image capturing device such as a camera in a video capturing mode or an image capturing mode. The processed image frame may be displayed on the display unit 606. Image frames processed by the graphics processing unit 6041 may be stored in the storage 609 (or other storage media) or sent via the radio frequency unit 601 or the network module 602. The microphone 6042 may receive sound and be able to process such sound into audio data. The processed audio data may be converted, in a case of a telephone communication mode, into a format output that may be sent to a mobile communication base station via the radio frequency unit 601.

The terminal device 600 also includes at least one sensor 605, such as a light sensor, a motion sensor, and other sensors. In particular, the light sensor includes an ambient light sensor and a proximity sensor, wherein the ambient light sensor may adjust brightness of the display panel 6061 according to brightness of ambient light. The proximity sensor may turn off the display panel 6061 and/or a backlight when the terminal device 600 moves close to the ear. As one type of motion sensor, the accelerometer sensor can detect a value of an acceleration in each direction (generally the three axes directions), and can detect a magnitude and a direction of gravity when being stationary, can be used to recognize a posture of a terminal (such as horizontal-vertical screen switching, a related game, a magnetometer posture calibration), a vibration-recognition related function (such as a pedometer, tapping), and the like. The sensor 605 may further include a fingerprint sensor, a pressure sensor, an iris sensor, a molecular sensor, a gyroscope, a barometer, a hygrometer, a thermometer, an infrared sensor, and the like, which will not be described herein.

The display unit 606 is used to display information inputted by the user or information provided to the user. The display unit 606 may include a display panel 6061 that may be configured in the form of a Liquid Crystal Display (LCD), an Organic Light-Emitting Diode (OLED), or the like.

The user input unit 607 may be used to receive inputted digital or character information and generate a key signal input related to user-setting and function control of a terminal. Specifically, the user input unit 607 includes a touch panel 6071 and other input devices 6072. The touch panel 6071, also referred to as a touch screen, may collect a touch operation (e.g., an operation of a user using any suitable object or accessory, such as a finger, stylus, or the like, on or near the touch panel 6071) of the user on or near the touch panel 6071. The touch panel 6071 may include two parts, i.e., a touch detection device and a touch controller. The touch detection device detects a touch orientation of the user, detects a signal brought about by a touch operation, transmits the signal to the touch controller, and the touch controller receives touch information from the touch detection device, converts the touch information into contact coordinates and sends the contact coordinates to the processor 610, and receives and executes commands from the processor 610. In addition, the touch panel 6071 may be implemented in various types such as a resistance type, a capacitance type, an infrared ray, and a surface acoustic wave. The user input unit 607 may also include other input devices 6072 in addition to the touch panel 6071. Specifically, the other input devices 6072 may include, but are not limited to, a physical keyboard, function keys (such as volume control keys, switch keys, etc.), a trackball, a mouse, and a joystick, which will not be described herein.

Further, the touch panel 6071 may be overlaid on the display panel 6061, and after the touch panel 6071 detects a touch operation on or near the touch panel 6071, the touch operation is sent by touch panel 6071 to the processor 610 to determine the type of a touch event. The processor 610 then provides a corresponding visual output on the display panel 6061 according to the type of the touch event. Although in FIG. 6, the touch panel 6071 and the display panel 6061 are two separate components for implementing input and output functions of the terminal, the input and output functions of the terminal in some embodiments may be realized by integrating the touch panel 6071 with the display panel 6061, and the present disclosure is not limited thereto.

The interface unit 608 is an interface in which an external device is connected to the terminal device 600. For example, the external device may include a wired or wireless headset port, an external power supply (or a battery charger) port, a wired or wireless data port, a memory card port, a port for connecting a device having an identification module, an audio input/output (I/O) port, a video I/O port, a headphone port, and so on. The interface unit 608 may be used to receive input (e.g., data information, power, etc.) from an external device and transmit the received input to one or more elements within the terminal device 600 or may be used to transmit data between the terminal device 600 and the external device.

The storage 609 may be used to store software programs and various types of data. The storage 609 may mainly include a storage program area and a storage data area, wherein, the storage program area may store an operating system, an application program required by at least one function (such as a sound playing function, an image playing function, etc.), and the like; the storage data area may store data (such as audio data, a phonebook, etc.) created according to a use condition of the mobile phone. In addition, the storage 609 may include a high speed random access memory, and may also include a non-transitory memory, such as at least one disk storage device, a flash memory device, or other volatile solid state storage device.

The processor 610 is a console of the terminal device, connects various parts of the entirety of the terminal using various interfaces and lines, and executes various functions and processes data of the terminal by running or executing software programs and/or modules stored in the storage 609, and by calling data stored in the storage 609, thereby integrally monitoring the terminal. The processor 610 may include one or more processing units; optionally, the processor 610 may integrate an application processor and a modem processor, wherein the application processor primarily processes an operating system, a user interface, an application program, etc. The modem processor mainly handles wireless communication. It will be appreciated that the above-described modem processor may also not be integrated into the processor 610.

The terminal device 600 may also include a power supply 611 (such as a battery) that supplies power to various components, optionally, the power supply 611 may be logically connected to the processor 610 via a power management system. Thus, functions such as charging, discharging, and power consumption management are managed by the power management system.

In addition, the terminal 600 includes some functional modules not shown, which will not be described here.

An embodiment of the present disclosure also provides a master node including a processor, a storage, and a computer program stored on the storage and executable by the processor, wherein, when the computer program is executed by the processor, the processor implements each process of the method embodiments of the above method of adding a secondary cell group applied to a master node, and the same technical effect can be achieved, and in order to avoid repetition, the description thereof is not repeated here.

Figure 7:
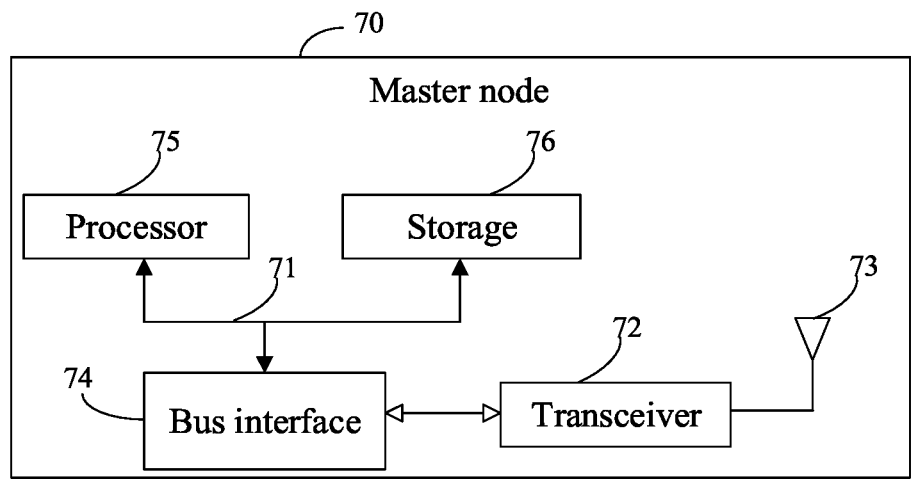
FIG. 7 is a second schematic structural diagram of a master node according to an embodiment of the present disclosure.

In particular, FIG. 7 is a schematic diagram of a hardware structure of a master node implementing various embodiment of that present disclosure. The master node 70 includes, but is not limited to, a bus 71, a transceiver 72, an antenna 73, a bus interface 74, a processor 75, and a storage 76.

In the embodiment of the present disclosure, the master node 70 further includes a computer program stored on the storage 76 and executable by the processor 75, wherein when the computer program is executed by processor 75, the processor 75 implements the follow steps: sending conditional-addition SCG information to a terminal device; wherein the conditional-addition SCG information is used by the terminal device for evaluating, according to the conditional-addition SCG information, whether one or more target cells in an SCG meet a condition corresponding to triggering addition of a target cell, and obtaining a result of the evaluation, and triggering, according to the result of the evaluation, a process of adding a target cell in the SCG.

The transceiver 72 is used for receiving and transmitting data under the control of the processor 75.

In FIG. 7, a bus architecture (represented by the bus 71) may include any number of interconnected buses and bridges, specifically various circuits such as one or more processors represented by the processor 75 and a memory represented by the storage 76 are linked together by the bus 71. The bus 71 may also link together various other circuits, such as peripheral devices, voltage regulators, and power management circuits, which are well known in the art, and thus will not be described further herein. The bus interface 74 provides an interface between the bus 71 and the transceiver 72. The transceiver 72 may be one or more elements, i.e., including a plurality of transmitters and receivers, for providing elements for communicating with various other devices over a transmission medium. Data processed by the processor 75 is transmitted over a wireless medium through the antenna 73. Further, the antenna 73 also receives data and sends the data to the processor 75.

The processor 75 is responsible for managing the bus 71 and general processing and may also provide various functions including timing, peripheral interfaces, voltage regulation, power management, and other control functions. The storage 76 may be used to store data used by the processor 75 when performing operations.

Optionally, the processor 75 may be a CPU, an ASIC, a FPGA, or a CPLD.

An embodiment of the present disclosure also provides a computer readable storage medium having a computer program stored thereon. When the computer program is executed by a processor, the processor implements each process of the method embodiments of the above method of adding a secondary cell group applied to a terminal device, and the same technical effect can be achieved, and in order to avoid repetition, the description thereof is not repeated here. The computer readable storage medium is, for example, a read-only memory (Read-Only Memory, ROM), a random access memory (Random Access Memory, RAM), a magnetic disk or an optical disc.

An embodiment of the present disclosure also provides a computer readable storage medium having a computer program stored thereon. When the computer program is executed by a processor, the processor implements each process of the method embodiments of the above method of adding a secondary cell group applied to a master node, and the same technical effect can be achieved, and in order to avoid repetition, the description thereof is not repeated here. The computer readable storage medium is, for example, a read-only memory (Read-Only Memory, ROM), a random access memory (Random Access Memory, RAM), a magnetic disk or an optical disc.

It should be noted that such terms as "include", "comprise", or any other variation thereof are intended to cover non-exclusive inclusions, such that a process, a method, an article or a device including a series of elements includes not only those elements, but also other elements that are not explicitly listed, or may also include elements inherent to such process, method, article, or device. An element after a phrase "including a" does not exclude presence of another identical element in a process, method, article or device including the element, if without further limitation.

Through the description of the foregoing embodiments, it is clear to those skilled in the art that the foregoing method embodiments may be implemented by software plus a necessary general hardware platform, and certainly may also be implemented by hardware, but in many cases, the former is a better implementation. Based upon such understanding, the technical solutions of the present disclosure essentially or a part thereof contributing to the prior art may be embodied in the form of a computer software product which may be stored in a storage medium (e.g., a ROM/RAM, a magnetic disk or an optical disk) and which includes several instructions to cause a terminal (which may be a personal computer, a server, an air-conditioner or a master node, etc.) to perform the methods described in the various embodiment of the present disclosure.

The embodiments of the present disclosure are described above with reference to the accompanying drawings, but the present disclosure is not limited to the above-mentioned specific embodiments, and the above-mentioned specific embodiments are only illustrative and not restrictive. A person of ordinary skill in the art with hints of the present disclosure may also make many forms that fall within the protection scope of the present disclosure without departing from the spirit of the present disclosure and the scope protected by the claims of the present disclosure.

What is claimed is:

1. A method of adding a secondary cell group, the method being performed by a terminal device, the method comprising:
    receiving conditional-addition Secondary Cell Group (SCG) information sent by a master node;
    evaluating, according to the conditional-addition SCG information, whether one or more target cells in an SCG meet a condition corresponding to triggering addition of a target cell, and obtaining a result of the evaluation;
    triggering, according to the result of the evaluation, a process of adding a target cell in the SCG,
    wherein, triggering the process of adding the target cell in the SCG comprises one or more of following:
        when the conditional-addition SCG information comprises the configuration information of one or more target cells conditionally added, performing configuration according to configuration information of a target cell that meets the condition corresponding to triggering the addition of the target cell;
        performing downlink synchronization with the target cell that meets the condition corresponding to triggering the addition of the target cell;
        initiating a random access procedure in the target cell that meets the condition corresponding to triggering the addition of the target cell,
    wherein after triggering the process of adding the target cell in the SCG, the method further comprises at least one of following:
    deleting one or more conditions corresponding to triggering the addition of the target cell; or,
    deleting configuration information of one or more target cells of an unconfigured condition.

2. The method according to claim 1, wherein the conditional-addition SCG information comprises one or more of following:
    identification information of one or more target cells conditionally added;
    configuration information of one or more target cells conditionally added;
    one or more conditions corresponding to triggering the addition of a target cell;
    identification information of one or more conditions corresponding to triggering the addition of the target cell.

3. The method according to claim 2, wherein the condition corresponding to triggering the addition of the target cell comprises one or more of following:
    a measurement result of the target cell reaching or exceeding a preset threshold;
    a measurement result of a serving cell reaching or falling below a preset threshold;
    difference between the measurement result of the target cell and the measurement result of the serving cell reaching or exceeding a preset threshold;
    the measurement result of the target cell reaching or exceeding a first preset threshold, and the measurement result of the serving cell reaching or falling below a second preset threshold.

4. The method according to claim 2, wherein the conditional-addition SCG information comprises one or more conditions corresponding to triggering the addition of the target cell and effective time of the one or more conditions;
    evaluating, according to the conditional-addition SCG information, whether one or more target cells in the SCG meet the condition corresponding to triggering the addition of the target cell, and obtaining the result of the evaluation, comprises:
        for each condition corresponding to triggering the addition of the target cell, starting a timer, wherein a duration of the timer is the effective time of each condition corresponding to triggering the addition of the target cell;
        before the timer expires, evaluating whether a corresponding target cell meets the condition corresponding to triggering the addition of the target cell, and obtaining the result of the evaluation.

5. The method according to claim 4, wherein in a case of starting at least one timer, the method further comprises at least one of following:
    when the conditional-addition SCG information comprises identification information of one or more conditions corresponding to triggering the addition of the target cell, and one or more timers of the at least one timer expires, deleting identification information, corresponding to an expired timer, of a condition corresponding to triggering the addition of the target cell;
    when the conditional-addition SCG information comprises configuration information of one or more target cells conditionally added, and one or more timers of the at least one timer expires, deleting configuration information, corresponding to an expired timer, of the target cell conditionally added.

6. The method according to claim 1, wherein, the conditional-addition SCG information comprises:
    effective time of one or more conditions corresponding to triggering the addition of the target cell.

7. The method according to claim 1, wherein after obtaining the result of the evaluation, the method further comprises:
    sending a notification message to the master node, wherein the notification message is used to notify the master node of related information of the SCG added by the terminal device.

8. The method according to claim 1, wherein after triggering the process of adding the target cell, the method further comprises:
    stopping evaluating whether one or more target cells in the SCG meet the condition corresponding to triggering the addition of the target cell.

9. A terminal device, comprising:
a storage, a processor, and a computer program stored on the storage and executable by the processor, wherein, when the computer program is executed by the processor, the processor implements steps of the method of adding a secondary cell group according to claim 1.

10. A method of adding a secondary cell group, the method being performed by a master node, the method comprising:
sending conditional-addition SCG information to a terminal device;
wherein the conditional-addition SCG information is used by the terminal device for evaluating, according to the conditional-addition SCG information, whether one or more target cells in an SCG meet a condition corresponding to triggering addition of a target cell, and obtaining a result of the evaluation, and triggering, according to the result of the evaluation, a process of adding a target cell in the SCG,
wherein, triggering the process of adding the target cell in the SCG comprises one or more of following:
when the conditional-addition SCG information comprises the configuration information of one or more target cells conditionally added, performing configuration according to configuration information of a target cell that meets the condition corresponding to triggering the addition of the target cell;
performing downlink synchronization with the target cell that meets the condition corresponding to triggering the addition of the target cell;
initiating a random access procedure in the target cell that meets the condition corresponding to triggering the addition of the target cell,
wherein after triggering the process of adding the target cell in the SCG, the terminal device performs at least one of following:
deleting one or more conditions corresponding to triggering the addition of the target cell; or deleting configuration information of one or more target cells of an unconfigured condition.

11. The method according to claim 10, wherein before sending the conditional-addition SCG information to the terminal device, the method further comprises:
sending conditional-addition SCG request information to one or more secondary nodes;
receiving conditional-addition SCG feedback information sent by the one or more secondary nodes;
wherein the conditional-addition SCG feedback information is used by the master node to determine corresponding conditional-addition SCG information.

12. The method according to claim 11, wherein the conditional-addition SCG request information comprises one or more of following:
identification information of one or more target cells conditionally added;
one or more conditions corresponding to triggering the addition of the target cell;
identification information of one or more conditions corresponding to triggering the addition of the target cell.

13. The method according to claim 11, wherein the conditional-addition SCG feedback information comprises one or more of following:
information of rejecting a SCG conditionally added;
information of agreeing a SCG conditionally added.

14. The method according to claim 11, wherein, after receiving the configuration confirmation information sent by the terminal device, the method further comprises:
sending the conditional-addition SCG confirmation information to the one or more secondary nodes.

15. The method according to claim 11, wherein after receiving conditional-addition SCG feedback information sent by the one or more secondary nodes, the method further comprises:
receiving conditional-addition SCG indication information sent by a target secondary node;
wherein the conditional-addition SCG indication information is sent by the target secondary node after the target secondary node detects that the terminal device accesses the target cell.

16. The method according to claim 11, wherein after receiving the conditional-addition SCG feedback information sent by one or more secondary nodes, the method further comprises:
sending, to other secondary nodes, related information of cancelling a conditional-addition SCG;
wherein the related information of cancelling the conditional-addition SCG is used for the other secondary nodes to cancel a resource reserved for the corresponding conditional-addition SCG, the other secondary nodes are secondary nodes other than the target secondary node among the one or more secondary nodes.

17. The method according to claim 11, wherein after receiving conditional-addition SCG feedback information sent by the one or more secondary nodes, the method further comprises:
receiving related information, sent by other secondary nodes, of cancelling a conditional-addition SCG;
confirming, according to the related information of cancelling the conditional-addition SCG, that the corresponding conditional-addition SCG is cancelled;
wherein the other secondary nodes are secondary nodes other than the target secondary node among the one or more secondary nodes.

18. A master node, comprising:
a storage, a processor, and a computer program stored on the storage and executable by the processor, wherein, when the computer program is executed by the processor, the processor implements steps of the method of adding a secondary cell group according to claim 10.

* * * * *